United States Patent
Tu

(10) Patent No.: US 12,508,993 B2
(45) Date of Patent: Dec. 30, 2025

(54) DASH CAM

(71) Applicant: VIA Technologies, Inc., New Taipei (TW)

(72) Inventor: Yujen Tu, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 63 days.

(21) Appl. No.: 18/503,180

(22) Filed: Nov. 7, 2023

(65) Prior Publication Data

US 2025/0091516 A1    Mar. 20, 2025

(30) Foreign Application Priority Data

Sep. 18, 2023   (TW) .................................. 112135558

(51) Int. Cl.
| | |
|---|---|
| *B60R 1/24* | (2022.01) |
| *B60R 11/04* | (2006.01) |
| *H01Q 1/22* | (2006.01) |
| *H04N 23/50* | (2023.01) |
| *B60R 11/00* | (2006.01) |

(52) U.S. Cl.
CPC ................ *B60R 1/24* (2022.01); *B60R 11/04* (2013.01); *H01Q 1/22* (2013.01); *H04N 23/50* (2023.01); *B60R 2011/0026* (2013.01); *B60R 2011/0063* (2013.01)

(58) Field of Classification Search
CPC ... B60R 1/24; B60R 11/04; B60R 2011/0026; B60R 2011/0063; H01Q 1/22; H04N 23/50

USPC ........................................................ 348/148
See application file for complete search history.

(56) References Cited

U.S. PATENT DOCUMENTS

| | | | |
|---|---|---|---|
| 2012/0013741 A1* | 1/2012 | Blake, III .............. | H04N 23/55 348/148 |
| 2018/0175491 A1* | 6/2018 | DeMersseman ....... | H04N 23/57 |
| 2022/0124235 A1* | 4/2022 | Wang ..................... | H04N 23/70 |
| 2024/0298083 A1* | 9/2024 | Nandyala ............... | H04N 23/54 |

FOREIGN PATENT DOCUMENTS

| | | |
|---|---|---|
| CN | 102252680 | 11/2011 |
| CN | 105552498 | 7/2019 |
| CN | 214067836 U | 8/2021 |
| CN | 216527306 | 5/2022 |
| CN | 216805304 | 6/2022 |
| TW | M397930 | 2/2011 |

(Continued)

OTHER PUBLICATIONS

"Office Action of Taiwan Counterpart Application", issued on Sep. 20, 2024, p. 1-p. 6.

(Continued)

*Primary Examiner* — Kathleen M Walsh
(74) *Attorney, Agent, or Firm* — JCIPRNET

(57) ABSTRACT

A dash cam includes a dash cam body, a plastic enclosure, an antenna module, and a connecting bracket. The dash cam body has a camera. The plastic enclosure has an adhesive surface and is suited for being pasted onto an inner side of a vehicle windshield through the adhesive surface. The antenna module is disposed inside the plastic enclosure and is electrically connected to the dash cam body. The connecting bracket is connected between the plastic enclosure and the dash cam body.

10 Claims, 5 Drawing Sheets

(56) References Cited

FOREIGN PATENT DOCUMENTS

| | | | |
|---|---|---|---|
| TW | M484528 U | 8/2014 | |
| TW | 201816466 | 5/2018 | |
| TW | 201902024 | 1/2019 | |
| WO | WO-2018074007 A1 * | 4/2018 | ........... H04B 1/3822 |
| WO | WO-2024257564 A1 * | 12/2024 | |

OTHER PUBLICATIONS

"Office Action of Taiwan Counterpart Application", issued on Apr. 18, 2025, p. 1-p. 9.
"Office Action of Taiwan counterpart Application", issued on Sep. 1, 2025, p. 1-p. 11.

* cited by examiner

DASH CAM

CROSS-REFERENCE TO RELATED APPLICATION

This application claims the priority benefit of Taiwan application serial no. 112135558 filed on Sep. 18, 2023. The entirety of the above-mentioned patent application is hereby incorporated by reference herein and made a part of this specification.

BACKGROUND

Technical Field

The disclosure relates to an automotive device, specifically to a dash cam.

Description of Related Art

A dash cam usually is mounted on an inner side of a vehicle windshield for recording vehicle driving footage, including real-time image inside and outside of a vehicle, real-time sounds, and real-time coordinates of the location of the vehicle. A conventional dash cam includes a dash cam body and a bracket. The bracket may be pasted onto the inner side of a vehicle windshield. The dash cam body is rotatably connected to the bracket for further adjusting the position of the dash cam body inside the vehicle. The dash cam may be equipped with an antenna for external wireless communication. The antenna of the dash cam usually is disposed inside a plastic enclosure of the dash cam body. In other words, the bracket is positioned between the antenna and the windshield. However, a metal portion of the bracket is likely to damper antenna sensitivity. Hence, it takes time to fine-tune the position of the antenna and consequently extends time required for new product development.

SUMMARY

The disclosure provides a dash cam, in which an antenna is provided independently and modularized.

A dash cam according to an aspect of the disclosure includes a dash cam body, a plastic enclosure, an antenna module, and a connecting bracket. The dash cam body has a camera. The plastic enclosure has an adhesive surface and is suited for being pasted onto the inner side of a vehicle windshield through the adhesive surface. The antenna module is disposed inside the plastic enclosure and is electrically connected to the dash cam body. The connecting bracket is connected between the plastic enclosure and the dash cam body.

In light of the foregoing, in the disclosure, the antenna module is disposed separately from the dash cam body, incorporated with the plastic enclosure, and pasted onto the windshield. Thus, antenna module sensitivity is less affected by metal portions of other components of the dash cam, eliminating the need for fine-tuning the position of antenna. Time required for new product development is therefore reduced. Moreover, after modularizing components such as the antenna module, the plastic enclosure, and the connecting bracket, these components may be directly adopted in subsequent new products and hence, and thus time required for new product development is further reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
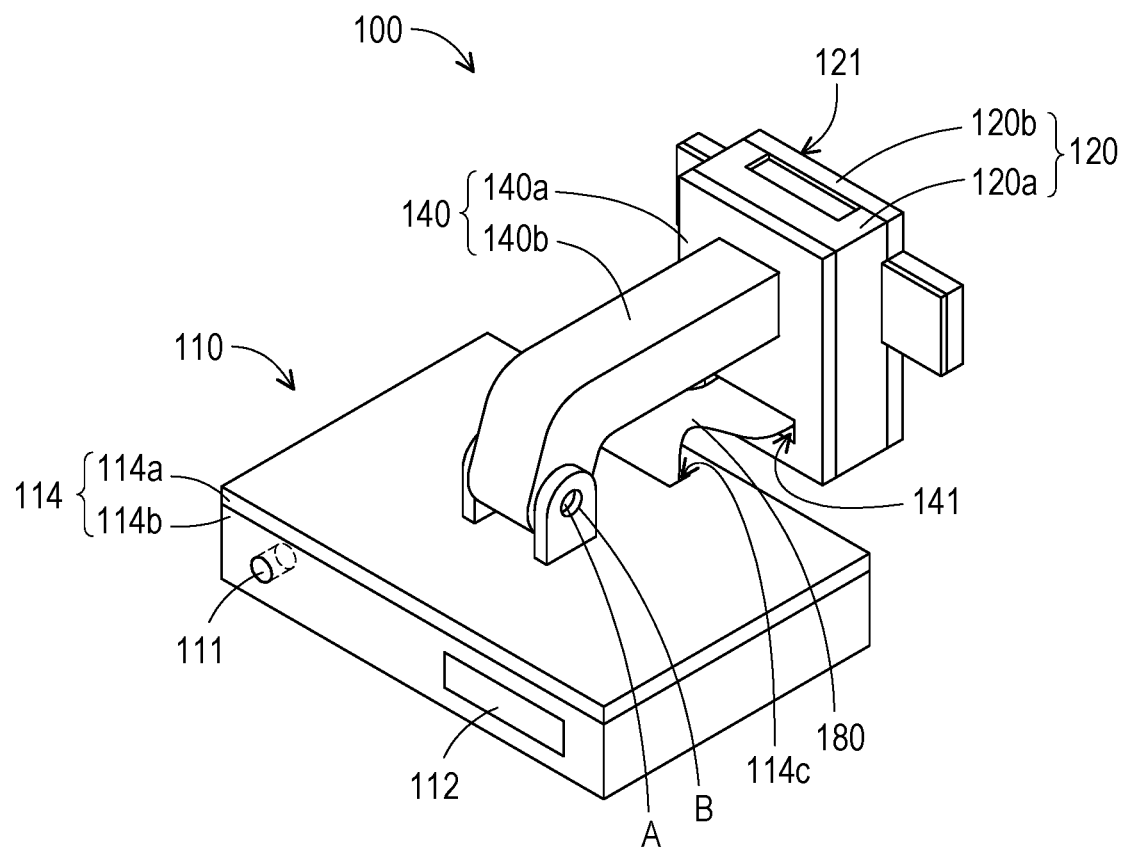
FIG. 1 is a schematic view illustrating a dash cam according to an embodiment of the disclosure.
Figure 3:
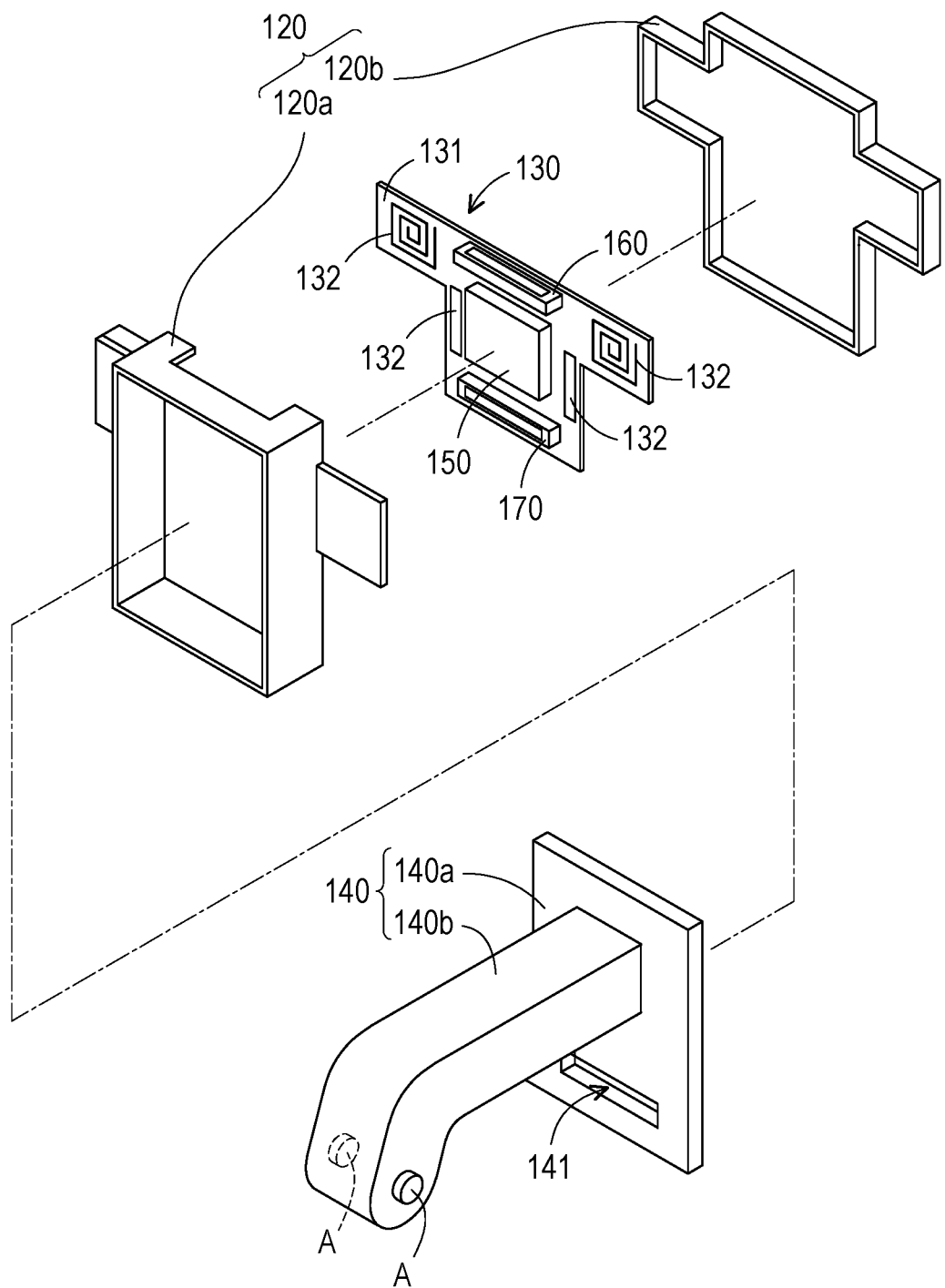
FIG. 3 is an exploded view illustrating some components of the dash cam in FIG. 2.

Referring to FIG. 1 and FIG. 3, in the embodiment, a dash cam 100 includes a dash cam body 110. The dash cam body 110 has one or multiple cameras 111 for shooting and storing images. The dash cam 100 further includes a plastic enclosure 120, an antenna module 130, and a connecting bracket 140. The plastic enclosure 120 has an adhesive surface 121 and is suited for being pasted onto the inner side of a vehicle windshield through the adhesive surface 121. An antenna module 130 (as indicated in FIG. 3) is disposed inside the plastic enclosure 120 and electrically connected to the dash cam body 110. The connecting bracket 140 is connected between the plastic enclosure 120 and the dash cam body 110. Hence, the dash cam body 110 receives a wireless signal through the antenna module 130 and is suspended beneath the windshield through the connecting bracket 140. Moreover, the dash cam body 110 may have a controlling interface 112, e.g., a physical button set or a touch panel.

In the embodiment, the connecting bracket 140 may be of metal material to ensure adequate structural strength while taking less space, so as to enlarge driver's field of view. The connecting bracket 140 may have a fixture 140*a* and an extension 140*b*. The fixture 140*a* is mounted to the plastic enclosure 120. The extension 140*b* extends from the fixture 140*a* to the dash cam body 110 and is connected to the dash cam body 110. The connecting bracket 140 is rotatably connected to the dash cam body 110. In the embodiment, the dash cam body 110 may have a rotating flexibility relative to the connecting bracket 140 through coordination between a shaft A and a shaft hole B. However, the disclosure is not limited thereto. In some other embodiments not illustrated herein, through a universal joint, the dash cam body 110 may have rotating flexibilities in three aspects relative to the connecting bracket 140.

Referring to FIG. 3, in the embodiment, to enable the plastic enclosure 120 to accommodate the antenna module 130, the plastic enclosure 120 has a plastic front 120*a* and a plastic rear 120*b* for sandwiching the antenna module 130 between the plastic front 120*a* and the plastic rear 120*b*. The plastic front 120*a* and the plastic rear 120*b* may be separately formed and then assembled together. However, the disclosure is not limited thereto. In some other embodiments not illustrated herein, the plastic enclosure 120 may be formed through one or more processes of injection to encapsulate the antenna module 130 and to sequester the antenna module 130 from the outer world.

Referring to FIG. 3, in the embodiment, the antenna module 130 may have a circuit board 131 and multiple antenna patterns 132. The antenna patterns 132 may be disposed on the circuit board 131 and connected to an internal circuit of the circuit board 131. For example, in production process of the circuit board 131, each antenna pattern 132 may be formed by a portion of a patterned metal layer of the circuit board 131. The antenna patterns 132 may serve as a 4G antenna, a WiFi antenna, or antenna of other wireless signal protocols, so as to receive and transmit wireless signals. Besides, the dash cam 100 may further include a GPS module 150 that is disposed on the circuit board 131 of the antenna module 130. In the embodiment, the antenna patterns 132 may include multiple pairs of antenna patterns 132, and each pair of the antenna patterns 132 are respectively positioned on two opposite sides of the GPS module 150.

Figure 2:
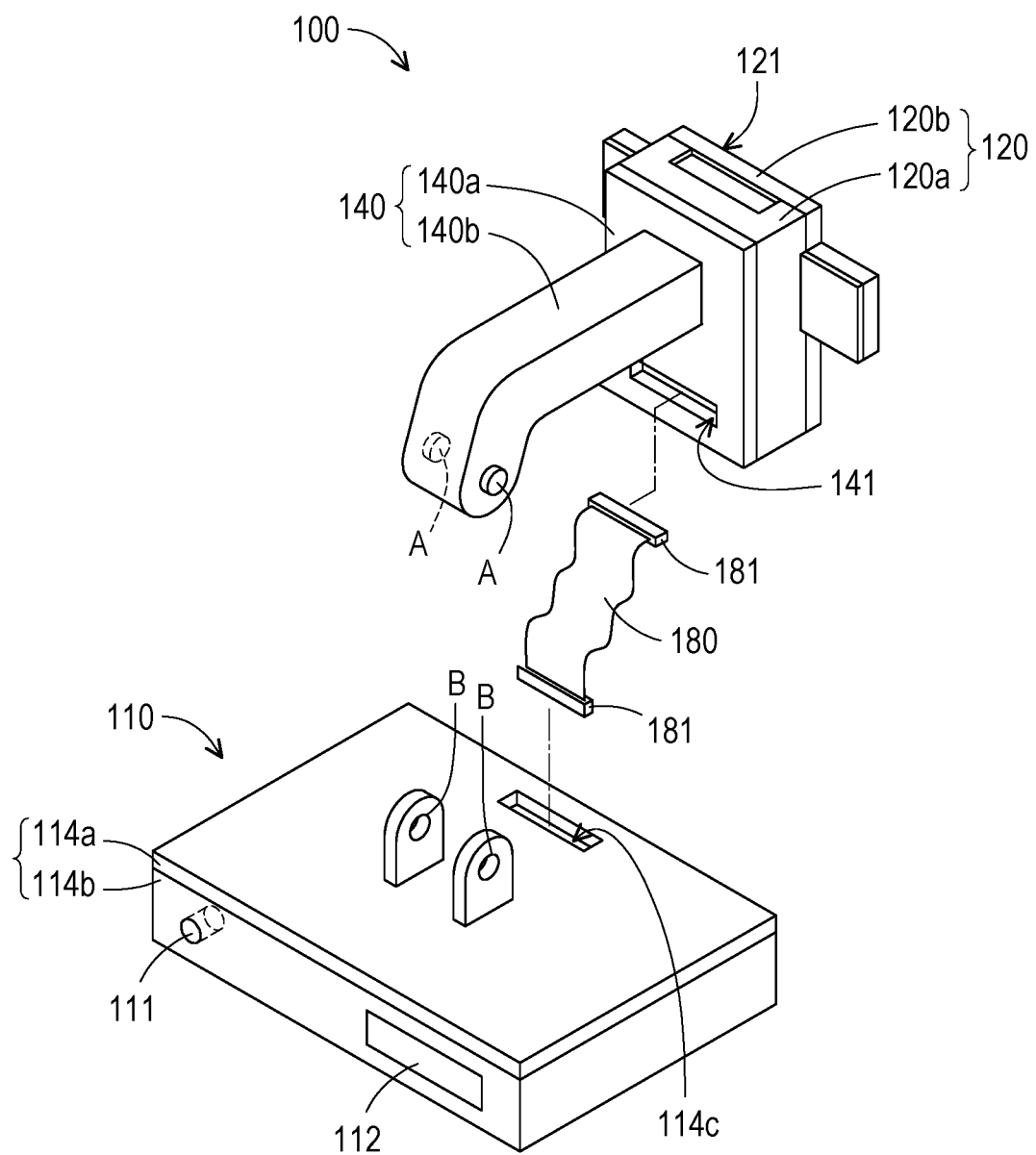
FIG. 2 is an exploded view illustrating the dash cam in FIG. 1.

Referring to FIG. 1. FIG. 2, and FIG. 3, in the embodiment, the dash cam 100 may further include a first transmission port 160, a second transmission port 170, and a transmission cable 180. The first transmission port 160 is disposed on the circuit board 131 and is connected to the internal circuit of the circuit board 131 so as to transmit power and signals. The second transmission port 170 is disposed on the circuit board 131 and is connected to the internal circuit of the circuit board 131 so as to transmit power and signals. Transmission ports at two ends of the transmission cable 180 are, respectively, connected to the second transmission port 170 and a body port 113 of the dash cam body 110 (as indicated in FIG. 4), enabling the body port 113 to transmit power and signals through the transmission cable 180.

Figure 4:
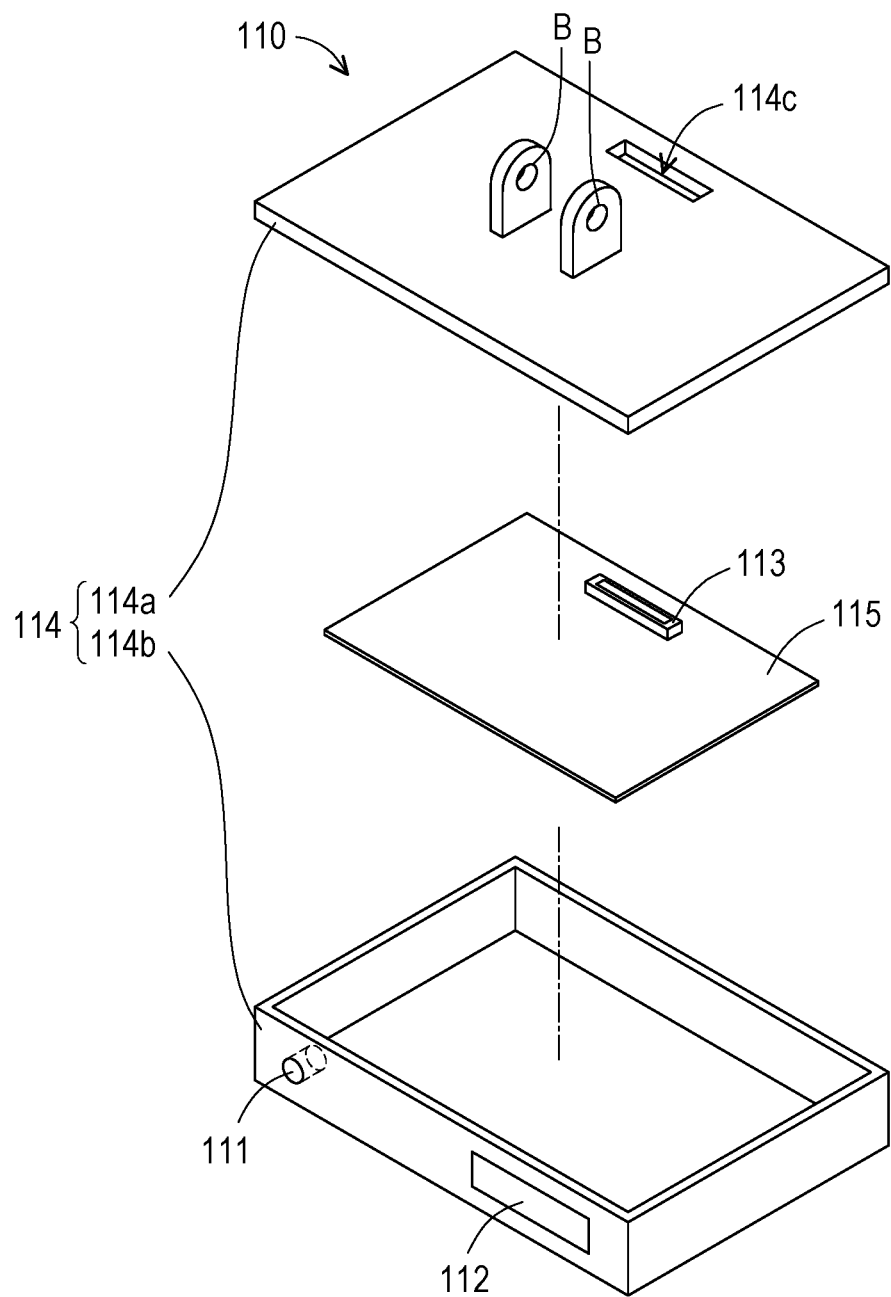
FIG. 4 is an exploded view illustrating a dash cam body of the dash cam in FIG. 2.

Referring to FIG. 1, FIG. 2, and FIG. 4, in the embodiment, the dash cam body 110 may have a body enclosure 114 and a motherboard 115. The motherboard 115 is disposed inside the body enclosure 114. The body enclosure 114 may include a metal top enclosure 114a and a plastic bottom enclosure 114b. The plastic bottom enclosure 114b is mounted to the metal top enclosure 114a. The motherboard 115 is disposed between the metal top enclosure 114a and the plastic bottom enclosure 114b and connected to the metal top enclosure 114a to be able to conduct heat. The metal top enclosure 114a and the connecting bracket 140 of metal material facilitate heat dissipation of the motherboard 115. The body port 113 is disposed on the motherboard 115. The plastic enclosure 120 has a plastic thread hole. The connecting bracket 140 has a bracket thread hole 141. The body enclosure 114 has a body thread hole 114c. The transmission cable 180 passes through the plastic thread hole, the bracket thread hole 141, and the body thread hole 114c. Accordingly, the connecting ports 181 at the two ends of the transmission cable 180 are respectively positioned inside the plastic enclosure 120 and the dash cam body 110.

Figure 5:
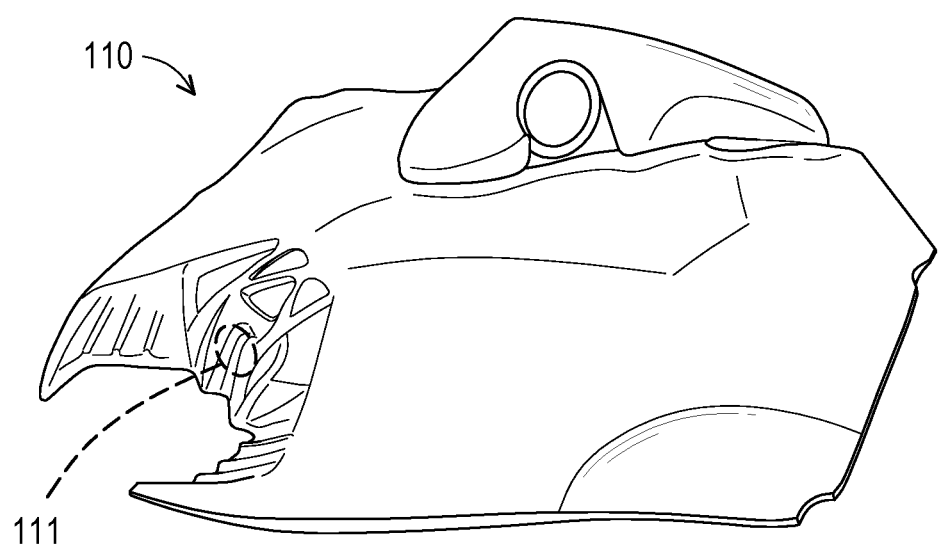
FIG. 5 is a schematic view illustrating a dash cam according to another embodiment of the disclosure.

Referring to FIG. 5, in another embodiment, the body enclosure 114 of the dash cam body 110 may be specially designed for hiding the camera 111 inside the specially designed enclosure. Thus, the camera 111 is not easily identified, and enhanced passenger experience is maintained.

In a nutshell, in the disclosure, the antenna module is disposed separately from the dash cam body, incorporated with the plastic enclosure, and pasted onto the windshield. Thus, antenna module sensitivity is less affected by metal portions of other components of the dash cam, eliminating the need for fine-tuning the antenna position. Time required for new product development is therefore reduced. Moreover, after modularizing components such as the antenna module, the plastic enclosure, and the connecting bracket, these components may be directly adopted in subsequent new products and hence, time required for new product development is further reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A dash cam, comprising:
   a dash cam body, having a camera;
   a plastic enclosure, having an adhesive surface and suited for being pasted onto an inner side of a vehicle windshield through the adhesive surface;
   an antenna module, disposed inside the plastic enclosure and electrically connected to the dash cam body; and
   a connecting bracket, connected between the plastic enclosure and the dash cam body.

2. The dash cam according to claim 1, wherein the connecting bracket is of metal material.

3. The dash cam according to claim 1, wherein the connecting bracket has a fixture and an extension, the fixture is mounted to the plastic enclosure, and the extension extends from the fixture to the dash cam body and is connected to the dash cam body.

4. The dash cam according to claim 1, wherein the connecting bracket is rotatably connected to the dash cam body.

5. The dash cam according to claim 1, wherein the antenna module has a circuit board and a plurality of antenna patterns, and the plurality of antenna patterns are disposed on the circuit board and connected to an internal circuit of the circuit board.

6. The dash cam according to claim 5, further comprising:
   a GPS module, mounted on the circuit board.

7. The dash cam according to claim 6, wherein the plurality of antenna patterns comprise a pair of antenna patterns, and the pair of antenna patterns are respectively positioned on two opposite sides of the GPS module.

8. The dash cam according to claim 5, further comprising:
   a first transmission port, disposed on the circuit board and connected to the internal circuit of the circuit board to transmit power and signals;
   a second transmission port, disposed on the circuit board and connected to the internal circuit of the circuit board to transmit power and signals; and
   a transmission cable, having two connecting ports, wherein the connecting ports are respectively located at two ends of the transmission cable and respectively connected to the second transmission port and a body port of the dash cam body to enable the body port to transmit power and signals through the transmission cable.

9. The dash cam according to claim 8, wherein the dash cam body has a body enclosure and a motherboard, the motherboard is disposed inside the body enclosure, the body port is disposed on the motherboard, the connecting bracket has a bracket thread hole, the body enclosure has a body thread hole, and the transmission cable passes through the bracket thread hole and the body thread hole for the connecting ports to be respectively positioned inside the plastic enclosure and the dash cam body.

10. The dash cam according to claim 9, wherein the body enclosure comprises a metal top enclosure and a plastic bottom enclosure mounted to the metal top enclosure, wherein the motherboard is disposed between the metal top enclosure and the plastic bottom enclosure and connected to the metal top enclosure to be able to conduct heat.

\* \* \* \* \*